(12) United States Patent
Halbinger

(10) Patent No.: US 12,553,787 B2
(45) Date of Patent: Feb. 17, 2026

(54) METHOD FOR DETECTING COATINGS AND/OR ADHESIONS ON THE OUTSIDE OF A MEASUREMENT MEMBRANE OF A PRESSURE MEASURING DEVICE

(71) Applicant: IFM Electronic GmbH, Essen (DE)

(72) Inventor: Lorenz Halbinger, Kißlegg (DE)

(73) Assignee: IFM Electronic GmbH, Essen (DE)

( * ) Notice: Subject to any disclaimer, the term of this patent is extended or adjusted under 35 U.S.C. 154(b) by 294 days.

(21) Appl. No.: 18/137,860

(22) Filed: Apr. 21, 2023

(65) Prior Publication Data

US 2023/0349785 A1 Nov. 2, 2023

(30) Foreign Application Priority Data

Apr. 27, 2022 (DE) .......................... 102022110245.9

(51) Int. Cl.
*G01L 27/00* (2006.01)
*G01L 19/06* (2006.01)

(52) U.S. Cl.
CPC ........ *G01L 27/007* (2013.01); *G01L 19/0627* (2013.01)

(58) Field of Classification Search
CPC . G01L 19/147; G01L 9/0072; G01L 19/0645; G01L 19/0084; G01L 13/025; G01L 19/0007; G01L 19/0038; G01L 9/0042; G01L 9/0073; G01L 9/0075; G01L 9/0054; G01L 9/0055; G01L 19/04; G01L 7/00; G01L 7/04; G01L 19/148; G01L 19/14; G01L 19/143; G01L 17/00;

(Continued)

(56) References Cited

U.S. PATENT DOCUMENTS 5,948,169 A * 9/1999 Wu .......................... C23C 16/52
73/718
6,993,973 B2 * 2/2006 Lischer ............... G01L 19/0636
361/283.4

(Continued)

FOREIGN PATENT DOCUMENTS

DE 10 2009 002 662 A1 10/2010
DE 102020100722 A1 * 7/2020
DE 10 2020 212 657 A1 4/2022

*Primary Examiner* — Andre J Allen
(74) *Attorney, Agent, or Firm* — Patent Technologies, LLC; Robert D. Gunderman, Jr.

(57) ABSTRACT

A method for recognizing deposits and/or adhesions on the outside of a measurement membrane of a pressure measuring device within a process facility is disclosed. The pressure measuring device includes a pressure measuring cell comprising a measurement membrane to detect pressure of a medium in a container. The outside of the measurement membrane is at least partially in contact with the medium its second side facing away from the medium includes means for detecting deflection of the measurement membrane. The pressure measuring device detects a micropulsation superimposed on the static pressure as an actual value. Micropulsations result from specific operating states of the process facility. Micropulsation conditions typical of specific operating states have been stored beforehand as setpoint values in an equalization procedure. The detected actual values are compared to the specified setpoint values, and an alarm signal is generated if they exceed and/or fall below the specified values.

3 Claims, 3 Drawing Sheets

(58) Field of Classification Search
CPC ....... G01L 7/18; G01L 19/0092; G01L 15/00; G01L 9/0051; G01L 7/041; G01L 9/12; G01L 9/065; G01L 19/0618; G01L 9/0052; G01L 9/125; G01L 7/16; G01L 19/0609; G01L 19/003; G01L 9/007; G01L 19/0627; G01L 19/0046; G01L 9/0022; G01L 9/06; G01L 19/0636; G01L 7/084; G01L 13/02; G01L 19/0023; G01L 19/142; G01L 7/043; G01L 19/08; G01L 9/0002; G01L 19/02; G01L 9/008; G01L 19/141; G01L 9/006; G01L 11/02; G01L 19/0672; G01L 23/10; G01L 23/18; G01L 19/0681; G01L 9/0077; G01L 19/12; G01L 27/005; G01L 7/082; G01L 9/0044; G01L 19/0015; G01L 19/0069; G01L 7/063; G01L 9/0001; G01L 19/146; G01L 21/12; G01L 27/002; G01L 27/007; G01L 9/16; G01L 11/00; G01L 19/00; G01L 9/0026; G01L 9/0089; G01L 9/045; G01L 9/14; G01L 19/0654; G01L 1/2281; G01L 11/025; G01L 13/026; G01L 11/008; G01L 7/22; G01L 13/00; G01L 9/0047; G01L 9/0076; G01L 7/08; G01L 9/0025; G01L 9/0035; G01L 9/0005; G01L 9/0041; G01L 19/0061; G01L 21/00; G01L 9/0019; G01L 9/10; G01L 9/08; G01L 11/006; G01L 9/04; G01L 19/086; G01L 9/0008; G01L 1/18; G01L 9/00; G01L 11/004; G01L 19/069; G01L 9/0057; G01L 19/083; G01L 19/10; G01L 19/16; G01L 19/06; G01L 9/0016; G01L 13/023; G01L 7/048; G01L 9/0048; G01L 9/0027; G01L 9/086; G01L 9/0079; G01L 11/04; G01L 1/20; G01L 9/0091; G01L 27/00; G01L 11/002; G01L 23/24; G01L 7/182; G01L 1/02; G01L 19/0663; G01L 7/166; G01L 23/22; G01L 9/0036; G01L 9/0061; G01L 9/0039; G01L 23/125; G01L 19/145; G01L 9/0013; G01L 21/04; G01L 9/0045; G01L 9/0092; G01L 1/142; G01L 7/104; G01L 9/0033; G01L 9/0083; G01L 9/0098; G01L 1/2293; G01L 7/24; G01L 9/02; G01L 21/22; G01L 9/0029; G01L 7/022; G01L 1/205; G01L 9/0064; G01L 23/08; G01L 5/14; G01L 23/16; G01L 7/088; G01L 7/163; G01L 9/0007; G01L 13/06; G01L 23/222; G01L 1/16; G01L 1/2287; G01L 9/0085; G01L 9/025; G01L 1/2212; G01L 21/14; G01L 9/0004; G01L 23/02; G01L 9/003; G01L 9/085; G01L 1/14; G01L 1/148; G01L 9/0058; G01L 9/105; G01L 7/02; G01L 7/061; G01L 9/002; G01L 1/2231; G01L 13/028; G01L 9/0095; G01L 23/28; G01L 1/162; G01L 19/0076; G01L 7/12; G01L 9/0038; G01L 9/0032; G01L 21/10; G01L 7/024; G01L 19/149; G01L 1/246; G01L 7/086; G01L 1/005; G01L 5/228; G01L 7/06; G01L 1/2206; G01L 7/102; G01L 13/021; G01L 27/02; G01L 1/2262; G01L 1/24; G01L 1/26; G01L 23/00; G01L 9/0094; G01L 19/144; G01L 9/0082; G01L 1/125; G01L 9/0097; G01L 1/146; G01L 1/2268; G01L 11/06; G01L 21/30; G01L 21/34; G01L 23/221; G01L 7/187; G01L 7/20; G01L 23/26; G01L 7/068; G01L 1/144; G01L 1/225; G01L 23/32; G01L 7/14; G01L 1/165; G01L 23/12; G01L 1/241; G01L 13/04; G01L 7/045; G01L 1/086; G01L 1/22; G01L 7/108; G01L 9/18; G01L 1/127; G01L 17/005; G01L 5/18; G01L 1/245; G01L 21/32; G01L 1/183; G01L 1/2218; G01L 9/0023; G01L 1/243; G01L 23/145; G01L 5/0047; G01L 5/0076; G01L 9/0088; G01L 1/106; G01L 1/10; G01L 9/001; G01L 1/186; G01L 23/223; G01L 25/00; G01L 5/165; G01L 5/226; G01L 9/0017; G01L 1/044; G01L 3/245; G01L 9/005; G01L 1/08; G01L 21/16; G01L 3/1485; G01L 5/0038; G01L 5/162; G01L 5/225; G01L 7/026; G01L 7/065; G01L 9/0014; G01L 1/04; G01L 1/242; G01L 21/24; G01L 3/10; G01L 5/0004; G01L 5/0052; G01L 7/10; G01L 1/00; G01L 1/103; G01L 1/2275; G01L 1/247; G01L 21/02; G01L 21/26; G01L 23/225; G01L 3/102; G01L 3/105; G01L 5/223; G01L 5/24; G01L 7/028; G01L 9/0011; G01L 5/00; G01L 5/0028; G01L 5/243; G01L 1/083; G01L 1/12; G01L 21/36; G01L 23/04; G01L 23/14; G01L 23/30; G01L 3/103; G01L 5/0033; G01L 5/102; G01L 5/133; G01L 5/1627; G01L 5/166; G01L 7/185; G01L 1/255; G01L 21/08; G01L 5/0057; G01L 5/22; G01L 1/042; G01L 1/122; G01L 1/2225; G01L 1/2243; G01L 1/2256; G01L 1/248; G01L 2009/0067; G01L 2009/0069; G01L 21/06; G01L 23/06; G01L 3/00; G01L 3/06; G01L 3/1478; G01L 3/1492; G01L 3/18; G01L 3/24; G01L 3/242; G01L 5/0061; G01L 5/08; G01L 5/10; G01L 5/101; G01L 5/108; G01L 5/16; G01L 5/161; G01L 5/167; G01L 5/28; G01L 1/046; G01L 2009/0066; G01L 2019/0053; G01L 23/085; G01L 23/20; G01L 5/0071; G01L 5/008; G01L 5/06; G01L 5/171; G01L 7/106
USPC .................................................. 73/700–756
See application file for complete search history.

(56) References Cited

U.S. PATENT DOCUMENTS

| | | | |
|---|---|---|---|
| 10,107,315 B2* | 10/2018 | Gu | G01L 19/0627 |
| 2012/0017691 A1* | 1/2012 | Ishihara | G01L 9/0075 |
| | | | 73/724 |
| 2015/0040674 A1* | 2/2015 | Ishihara | G01L 19/0636 |
| | | | 73/724 |

* cited by examiner

METHOD FOR DETECTING COATINGS AND/OR ADHESIONS ON THE OUTSIDE OF A MEASUREMENT MEMBRANE OF A PRESSURE MEASURING DEVICE

CROSS REFERENCE TO RELATED PATENT APPLICATIONS

This application claims priority to German Patent Application 10 2022 110 245.9 filed on Apr. 27, 2022 entitled "Verfahren zur Erkennung von Belägen und/oder Anhaftungen an der Außenseite einer Messmembran eines Druckinessgeräts" (Method for Detecting Coatings and/or Adhesions on the Outside of a Measurement Membrane of a Pressure Measuring Device) by Lorenz Halbinger, the entire disclosure of which is incorporated herein by reference in its entirety.

BACKGROUND OF THE INVENTION

1. Field of the Invention

This invention relates generally to pressure measuring devices, and more specifically to a method for detecting coatings and/or adhesions on the outside of a measurement membrane of a pressure measuring device.

2. Description of Related Art

Pressure measuring devices or pressure sensors are typically used for pressure measurement in a process facility in many industrial fields. They often include a capacitive ceramic pressure measuring cell as a measurement transducer for the process pressure and an evaluation electronics unit for signal processing. Typical measuring cells of this type consist of a compact unit having a ceramic base body and a membrane, wherein a ring-shaped joint, typically a glass solder ring, is arranged between the base body and the membrane. The cavity thus resulting between base body and membrane enables longitudinally-directed mobility of the membrane as a result of a pressure influence. Electrodes are provided in each case on the lower side of the membrane and on the opposite upper side of the base body, which together form a measurement capacitor. A deformation of the membrane occurs due to pressure action, which results in a capacitance change of the measurement capacitor. The capacitance change is detected and converted into a pressure measured value with the aid of the evaluation unit.

In addition to capacitive pressure measuring cells, there are also resistive pressure measuring cells in thin-film or thick-film technology, which detect the deflection of the membrane by means of strain gauges.

The pressure measuring devices are connected via a process fitting to a container or pipe guiding the medium. In general, pressure measuring devices are used to monitor or control processes. They are therefore often connected to higher-order control units (SPS).

Deposits can form within a pipeline or a container of the process facility, which can influence the flow of the medium, on the one hand, and above all in the case of high-viscosity media can also influence the deflection behaviour of the measurement membrane, on the other hand. As a result, corresponding cleaning processes must be carried out. Since the containers and pipelines are predominantly hermetically sealed toward the outside world, there is no possibility of a regular inspection during operation to determine whether cleaning has to be carried out. The cleaning cycle is therefore typically started according to empirical specifications. What is therefore needed is a method for detecting coatings and/or adhesions on the outside of a measurement membrane of a pressure measuring device.

BRIEF SUMMARY OF THE INVENTION

A method for recognizing deposits and/or adhesions on the outside of a measurement membrane of a pressure measuring device within a process facility, wherein the pressure measuring device includes a pressure measuring cell comprising the measurement membrane and is capable of detecting the pressure of a medium in a container; and wherein the outside of the measurement membrane is at least partially in contact with the medium and its second side facing away from the medium includes means for detecting the deflection of the measurement membrane; wherein the pressure measuring device detects a micropulsation superimposed on the static pressure as an actual value, wherein the micropulsations result from specific operating states of the process facility; micropulsation conditions typical for the specific operating states have been stored as setpoint values in an equalization procedure; and the detected actual values are compared to the specified setpoint values and an alarm signal is generated if they exceed and/or fall below the specified values.

BRIEF DESCRIPTION OF THE DRAWINGS

The invention is explained by way of example with reference to the attached drawings based on preferred exemplary embodiments, wherein the features shown below both individually and in combination may represent an aspect of the invention. In the drawings.

Figure 1:
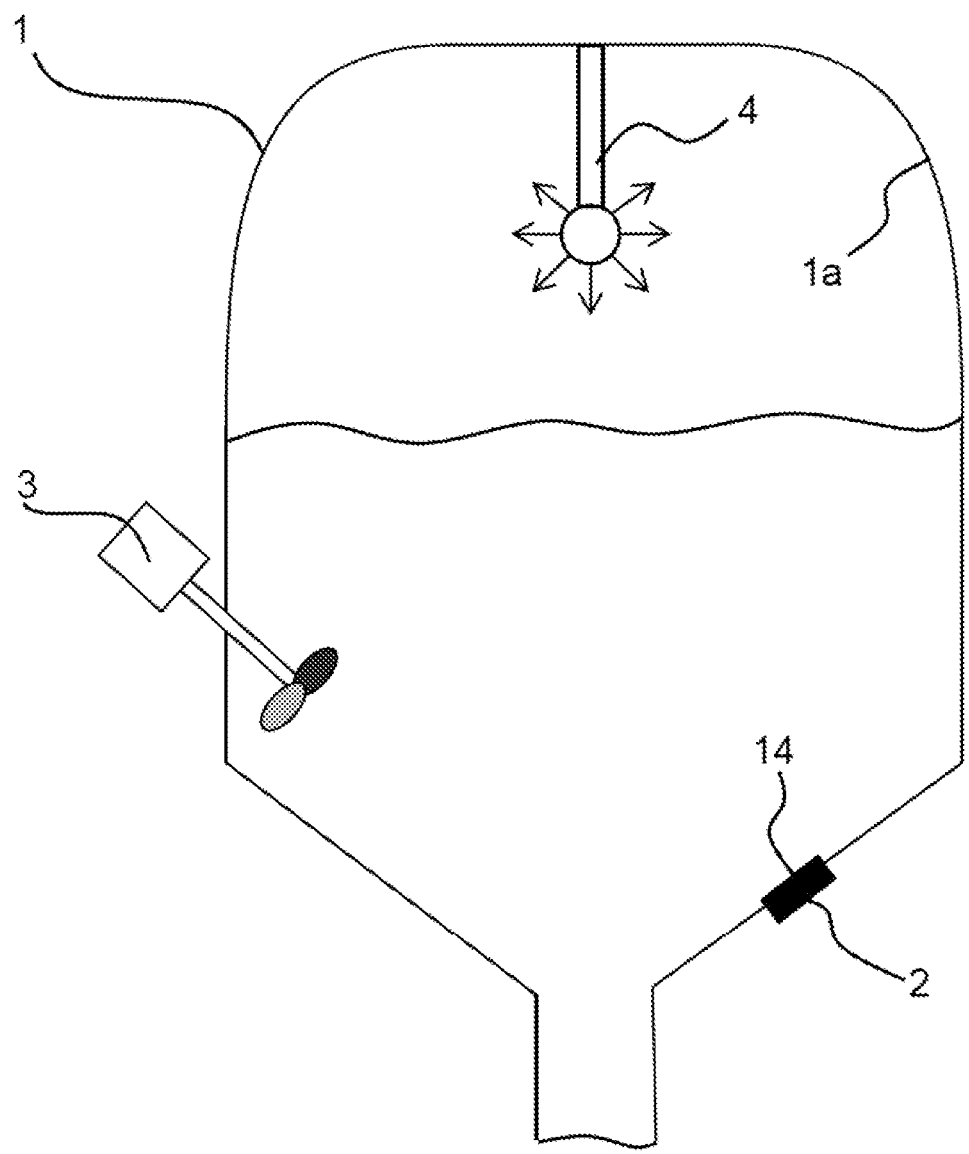
FIG. 1 shows a tank container having diverse process and metrological devices and apparatuses.

In the description of the preferred embodiments that follows, identical reference signs denote identical or comparable components.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by this specification and the attached drawings and claims.

DESCRIPTION OF THE PREFERRED EMBODIMENTS

For a general understanding of the present invention, reference is made to the drawings. The present invention will be described by way of example, and not limitation. Modifications, improvements and additions to the invention described herein may be determined after reading this specification and supporting claims and viewing the accompanying drawings; such modifications, improvements, and additions being considered included in the spirit and broad scope of the present invention and its various embodiments described or envisioned herein.

The present invention relates to a method for detecting coatings and/or adhesions on the outside of a measurement membrane of a pressure measuring device.

An object of the invention is to improve the automatic recognition of deposits and/or adhesions on the outside of a measurement membrane of a pressure measuring device in order to initiate appropriate cleaning procedures in a timely manner.

This object is achieved according to the invention by a method having the features of Claim 1. Advantageous embodiments of the invention are specified in the dependent claims.

The present invention is based on the finding that in certain operating states of a process facility, a micropulsation superimposed on the static pressure is to some extent induced as "background noise". These operating states can be, for example, the filling or emptying of a tank container, the mixing of the tank contents by a stirring mechanism, or the influence of a connected pump. That is to say, operating states can also mean general (process) sequences of the facility.

In an equalization procedure, initially micropulsation conditions typical for these specific operating states of the process facility have been stored as setpoint values, preferably in the form of an envelope curve. That is to say, a scope of measured values is specified which have to be at least achieved by the detected micropulsation in order to be able to presume a sufficiently movable and therefore sensitive measurement membrane of the pressure measuring device.

In running operation of the facility, the pressure measuring device then detects these micropulsations as an actual value. The specific operating states of the process facility can be established by the metrological monitoring of the process facility, which can certainly also be carried out by the pressure measuring device itself. The pressure measuring device thus detects a pressure increase, for example, during the filling amount increase or a pressure decrease during the filling amount reduction, respectively. The operation of a stirring mechanism and/or pump can be established in a higher-order control unit.

The detected actual values are compared to the setpoint values specified for the current operating state and an alarm signal is generated if they exceed and/or fall below the specified values. It is now possible by way of the specified scope, in particular by an envelope curve, to define an accurate threshold value in spite of the greatly differing measured value curve of the micropulsation at each point in time, which separates the good range from the bad range, so that if this threshold value is progressively exceeded and/or fallen below, a measurement membrane increasingly subjected to a coating can be presumed even without visual inspection and appropriate cleaning procedures can be initiated in a timely manner.

The method according to the present invention is thus a preventive measure, which can recognize the function of a pressure measuring device which is still metrologically perfect but is no longer one hundred percent, and thus prevents its metrological failure, since it is to a certain extent "blinded" by the coating. The advantage here is above all that no additional and complex measurement structure is necessary for this purpose, rather the pressure measuring device so to speak monitors itself, in that in addition to the pressure as the process measured value, it also monitors "background noises" which are metrologically irrelevant as such.

In one advantageous refinement of the present invention, it is provided that the recognition of the specific operating states is additionally detected by further measuring devices. Thus, for example, the filling amount increase or reduction can be detected by a flow measuring device in the inflow and/or outflow of the container and can be compared to the corresponding pressure values of the pressure measuring device detected in parallel.

In the following description of the preferred embodiments, identical reference signs designate identical or comparable components.

FIG. 1 shows a tank container 1, in which several process and metrological devices and apparatuses 2, 3, 4 are indicated by way of example and shown schematically. The tank container 1 is half-full in the present case. Depending on the medium, thinner or thicker deposits can occur on the insides 1a of the tank container 1, for example due to precipitation, chemical reactions, or dehydration. Since a pressure measuring device 2 is also located in the lower area of the tank container 1, the measurement membrane 14 of the pressure measuring device 2 is accordingly part of the inside 1a of the tank container 1 and is therefore also affected by the deposit effect. In the measurement membrane 14, this deposit can result in mortaring, by which the deflection behaviour of the measurement membrane 14 can be influenced. As a result, this does not always mean a complete failure of the pressure measuring device 2 immediately, but rather may result in the sensitivity and detection of rapid pressure changes being degraded. Up to this point, corresponding cleaning procedures have been carried out according to empirical specifications.

In a cleaning, for example, the inner wall 1a is sprayed with a hot cleaning liquid containing acid or base and then, after all residues and contaminants have been removed, is flushed with cold clear water. The cleaning liquid is distributed, for example, by means of a spray head 4, as indicated in FIG. 1.

Certain micropulsations arise in the process facility in the case of certain operating conditions, induced by diverse apparatuses, such as a stirring mechanism 3 provided for mixing the medium or due to the process itself, for example when the medium flows into or out of the tank container 1.

Figure 2:
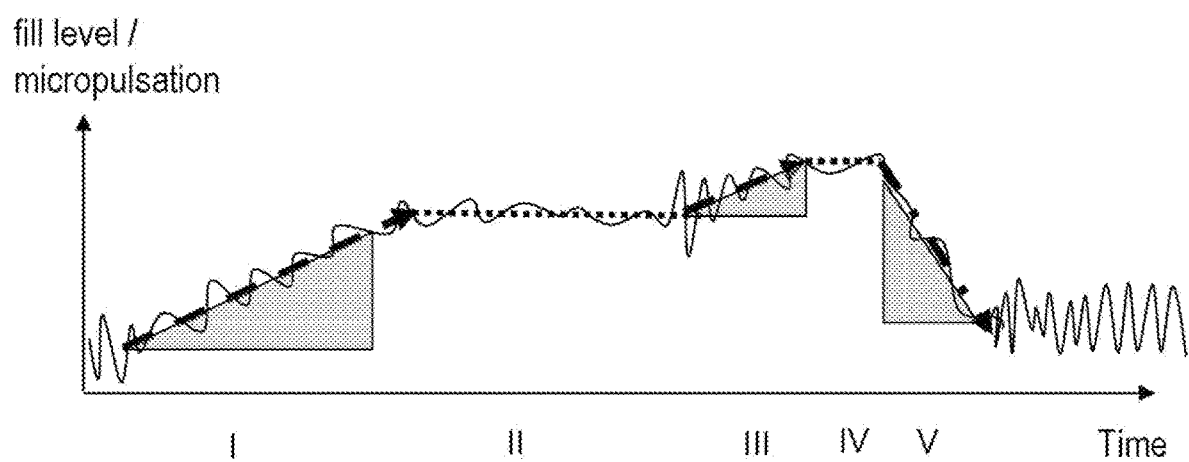
FIG. 2 shows an exemplary signal curve of fill level and micropulsation.

Possible signal curves of a micropulsation in certain operating states are shown by way of example in FIG. 2. The following are shown as operating states by Roman numerals:

I—a filling amount increase
II—uniform fill level with stirring mechanism operation
III—further filling amount increase
IV—uniform fill level with stirring mechanism operation
V—filling amount reduction It can be seen that there are different signal curves, even in the case of causes which are identical as such. A different fill level can therefore more or less strongly damp the signal curve of the micropulsation induced by a stirring mechanism. Accordingly, when the setpoint values are stored, a variety of operating states have to be taken into consideration and the threshold values, which must not be exceeded and/or fallen below, are varied accordingly.

Figure 3:
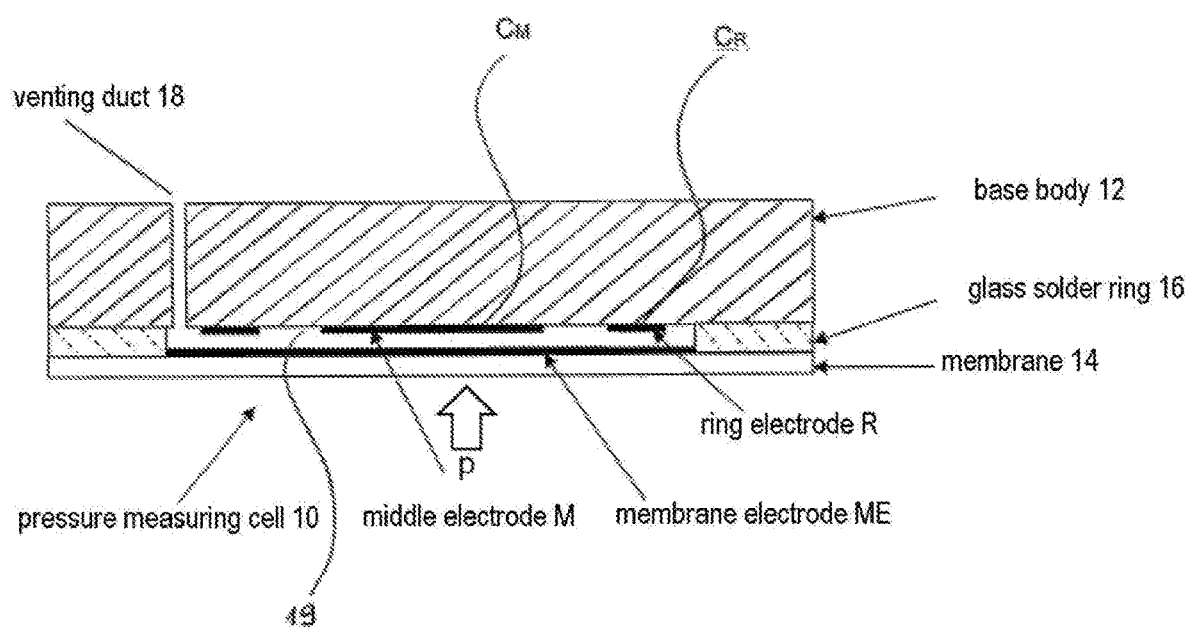
FIG. 3 shows a schematic sectional illustration of a capacitive pressure measuring cell.

FIG. 3 shows as an exemplary application a typical capacitive pressure measuring cell 10, as is used in a variety of ways in capacitive pressure measuring devices, in a schematic illustration. The pressure measuring cell 10 comprises a base body 12 and a membrane 14, which are connected to one another via a glass solder ring 16. The base body 12 and the membrane 14 delimit a cavity 19 which is connected—preferably only at low pressure ranges up to 50 bar—via a venting duct 18 to the rear side of the pressure measuring cell 10.

Multiple electrodes, which form a reference capacitor $C_R$ and a measurement capacitor $C_M$, are provided on both the base body 12 and the membrane 14. The measurement capacitor $C_M$ is formed by the membrane electrode ME and the middle electrode M, the reference capacitor $C_R$ is formed by the ring electrode R and the membrane electrode ME.

The process pressure p acts on the membrane 14, which deflects more or less in accordance with the pressure application. The deflection behaviour of the measurement membrane 14 can change due to deposits on the side her facing toward the medium. Essentially, the distance of the membrane electrode ME to the middle electrode M changes in this case. This results in a corresponding capacitance change of the measurement capacitor $C_M$. The influence on the reference capacitor $C_R$ is less, since the distance between ring electrode R and membrane electrode ME charges less strongly than the distance between the membrane electrode ME and the middle electrode M.

However, the present invention is not restrict capacitive pressure measuring cells or pressure measuring devices, but rather is also just as applicable in resistive pressure measuring cells, which detect the pressure-related deformation of the membrane by means of strain gauges or piezo elements.

LIST OF REFERENCE SIGNS

1 container, tank container
1a inner wall
2 pressure measuring device
3 stirring mechanism
4 spray head
10 pressure measuring cell
12 base body
14 measurement membrane
16 glass solder ring
18 venting channel
19 cavity
$C_M$ measurement capacitor
$C_R$ reference capacitor
M middle electrode
R ring electrode
ME membrane electrode While the various objects of this invention have been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of this specification and the attached drawings and claims.

What is claimed is:

1. A method for recognizing deposits and/or adhesions on the outside of a measurement membrane (14) of a pressure measuring device (2) within a process facility, wherein the pressure measuring device (2) includes a pressure measuring cell (10) comprising the measurement membrane (14) and wherein the measurement membrane (14) detects the pressure of a medium in a container;

and wherein the outside of the measurement membrane (14) is at least partially in contact with the medium and its second side facing away from the medium includes means for detecting the deflection of the measurement membrane (14);

wherein the pressure measuring device (2) detects a micropulsation superimposed on the static pressure as an actual value, wherein the micropulsations result from specific operating states of the process facility;

micropulsation conditions typical for the specific operating states have been stored as setpoint values in an equalization procedure;

and the detected actual values are compared to the specified setpoint values and an alarm signal is generated if they exceed and/or fall below the specified values.

2. The method according to claim 1, wherein the setpoint values are stored as an envelope curve.

3. The method according to claim 1, wherein recognition of the specific operating states is additionally detected by further measuring devices.

* * * * *